(12) United States Patent
Hull et al.

(10) Patent No.: US 10,351,758 B2
(45) Date of Patent: Jul. 16, 2019

(54) TREATMENT OF KEROGEN IN SUBTERRANEAN FORMATIONS

(71) Applicant: Saudi Arabian Oil Company, Dhahran (SA)

(72) Inventors: Katherine Leigh Hull, Houston, TX (US); Ghaithan A. Al-Muntasheri, Houston, TX (US); Younane N. Abousleiman, Norman, OK (US); David Jacobi, Spring, TX (US)

(73) Assignee: Saudi Arabian Oil Company, Dhahran (SA)

( * ) Notice: Subject to any disclaimer, the term of this patent is extended or adjusted under 35 U.S.C. 154(b) by 177 days.

(21) Appl. No.: 15/254,173

(22) Filed: Sep. 1, 2016

(65) Prior Publication Data

US 2017/0066959 A1 Mar. 9, 2017

Related U.S. Application Data

(60) Provisional application No. 62/213,744, filed on Sep. 3, 2015.

(51) Int. Cl.
| | |
|---|---|
| *E21B 43/26* | (2006.01) |
| *C09K 8/58* | (2006.01) |
| *C09K 8/03* | (2006.01) |
| *C09K 8/66* | (2006.01) |
| *C09K 8/80* | (2006.01) |

(52) U.S. Cl.
CPC ............... *C09K 8/58* (2013.01); *C09K 8/032* (2013.01); *C09K 8/665* (2013.01); *C09K 8/805* (2013.01); *E21B 43/26* (2013.01); *C09K 2208/26* (2013.01)

(58) Field of Classification Search
CPC .......... C09K 8/58; C09K 8/665; C09K 8/805; C09K 2208/26; E21B 43/26
USPC ...................................................... 166/308.1
See application file for complete search history.

(56) References Cited

U.S. PATENT DOCUMENTS

| | | |
|---|---|---|
| 3,284,281 A | 11/1966 | Thomas |
| 3,807,557 A | 4/1974 | Miller |
| 3,926,575 A | 12/1975 | Meyers |
| 3,996,062 A | 12/1976 | Frost |

(Continued)

FOREIGN PATENT DOCUMENTS

| | | |
|---|---|---|
| WO | 2004/005435 | 1/2004 |
| WO | 2013/149122 | 10/2013 |

OTHER PUBLICATIONS

International Search Report and Written Opinion of the Interantional Searching Authority issued in International Application No. PCT/US2016/049958 dated Nov. 23, 2016; 10 pages.

(Continued)

*Primary Examiner* — Silvana C Runyan
(74) *Attorney, Agent, or Firm* — Fish & Richardson P.C.

(57) ABSTRACT

Provided in this disclosure, in part, are methods, compositions, and systems for degrading organic matter, such as kerogen, in a subterranean formation. Further, these methods, compositions, and systems allow for increased hydraulic fracturing efficiencies in subterranean formations, such as unconventional rock reservoirs. Also provided in this disclosure is a method of treating kerogen in a subterranean formation including placing in the subterranean formation a composition that includes a first oxidizer including a persulfate and a second oxidizer including a bromate.

7 Claims, 7 Drawing Sheets

(56) References Cited

U.S. PATENT DOCUMENTS

| | | | |
|---|---|---|---|
| 4,043,885 A | 8/1977 | Yen et al. | |
| 4,289,639 A | 9/1981 | Buske | |
| 4,324,560 A | 4/1982 | Fonseca | |
| 4,381,950 A | 5/1983 | Lawson | |
| 4,594,170 A | 6/1986 | Brown et al. | |
| 4,640,692 A | 2/1987 | Audeh | |
| 5,224,543 A | 7/1993 | Watkins | |
| 6,138,760 A | 10/2000 | Lopez et al. | |
| 6,488,091 B1 * | 12/2002 | Weaver | C09K 8/62 166/300 |
| 6,494,263 B2 | 12/2002 | Todd | |
| 6,866,048 B2 | 3/2005 | Mattox | |
| 6,986,391 B2 * | 1/2006 | Funkhouser | C09K 8/68 166/300 |
| 8,851,177 B2 | 10/2014 | Wigand | |
| 8,936,089 B2 | 1/2015 | Wigand | |
| 2007/0298979 A1 | 12/2007 | Perry et al. | |
| 2008/0070806 A1 | 3/2008 | Lin et al. | |
| 2009/0143252 A1 | 6/2009 | Lehmann | |
| 2009/0203557 A1 * | 8/2009 | Barnes | C09K 8/584 507/259 |
| 2009/0313772 A1 * | 12/2009 | Talley | C09K 8/524 15/3.5 |
| 2010/0010106 A1 | 1/2010 | Crews | |
| 2012/0247774 A1 | 10/2012 | Li et al. | |
| 2013/0160994 A1 | 6/2013 | Alsop et al. | |
| 2014/0045732 A1 * | 2/2014 | Mazyar | C09K 8/58 507/242 |
| 2014/0374104 A1 | 12/2014 | Kushal | |
| 2015/0300140 A1 * | 10/2015 | Eoff | E21B 43/25 166/300 |
| 2017/0066959 A1 | 3/2017 | Hull et al. | |

OTHER PUBLICATIONS

Montgomery, Carl; "Fracturing Fluid Components", Chapter 2, Intech open science | open minds, Montgomery ; licensee Intch. 2013, 21 pages; http://dx.doi.oorg/10.5772/56422.

Daneshy, Ali; "Hydraulic Fracturing to Improve Production"; Tech 101, TheWayAhead, vol. 6, No. 3, 2010; 4 pages.

Laurent Brochard et al.; "Fracture Properties of Kerogen and Importance for Organic-Rich Shales"; Annual World Conference on Carbon (Carbon 2013), Jul. 2013, Rio de Janeiro, Brazil. HAL ID: hal-01274161, 6 pages.

Hydraulic Fracturing Fluid Product Component Information Disclosure; 2 pages.

Gulf Cooperation Council Examination Report issued in GCC Application No. GC 2016-31980 dated Sep. 24, 2018, 4 pages.

International Search Report and Written Opinion issued in International Application No. PCT/US2017/049866 dated Dec. 1, 2017; 11 pages.

Wang et al. Iron Sulfide Scale Dissolvers: How Effective Are They?, SPE 168063, Society of Petroleum Engineers, presented at the SPE Saudi Arabia section Annual Technical Symposium and Exhibition, May 19-22, 2013, 22 pages.

\* cited by examiner

FIG. 2A 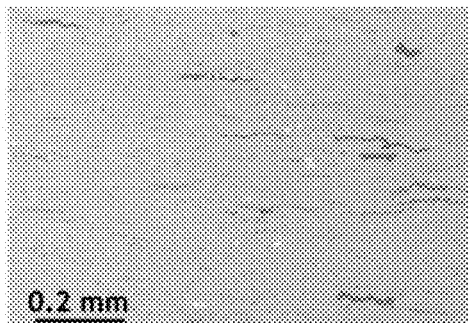

LEVEL III ('Macro')

>10⁻³ m

Layered composite shale with clay/quartz matrix (light gray) and organic layers (dark gray)

FIG. 2B 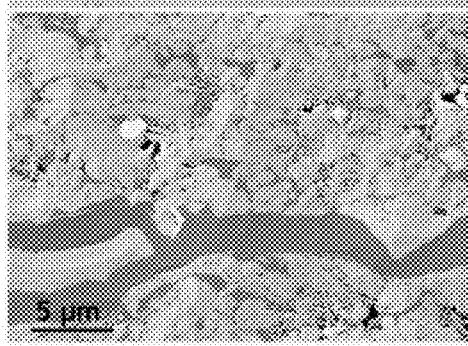

LEVEL II ('Micro')

>10⁻⁵ m

Kerogen and micro-pores distributed throughout the mineral matrix

FIG. 2C 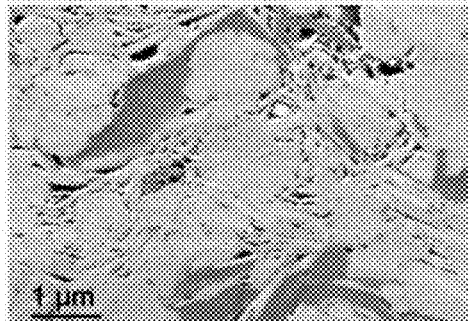

LEVEL I ('Sub-Micro')

>10⁻⁷ m

Nano-porous minerals and nano-porous organic matter interwoven

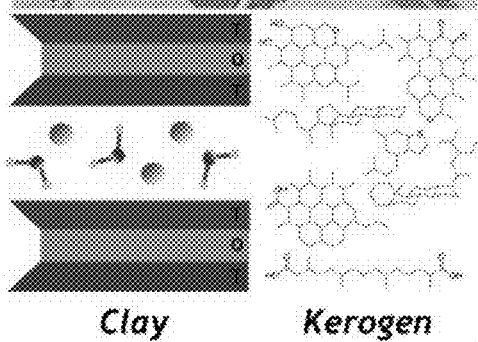

LEVEL 0 ('Nano')

>10⁻⁹ m

Elementary components: clays (illite, smectite, etc.) and organic molecules

*Clay*     *Kerogen*

FIG. 2D     FIG. 2E

TREATMENT OF KEROGEN IN SUBTERRANEAN FORMATIONS

CROSS-REFERENCE TO RELATED APPLICATIONS

This application claims the benefit of the filing date of U.S. Provisional Application Ser. No. 62/213,744 filed Sep. 3, 2015. The contents of U.S. Provisional Application Ser. No. 62/213,744 are incorporated by reference in their entirety as part of this application.

TECHNICAL FIELD

This document relates to methods and compositions used in treating subterranean formations for enhancing hydrocarbon fluid recovery.

BACKGROUND

Unconventional hydrocarbon reservoirs are reservoirs with trapped hydrocarbons (for example, oil, natural gas, or combinations of them) in which the hydrocarbon mobility is limited. Extraction of hydrocarbons from such reservoirs typically involves increasing the mobility of the hydrocarbons, for example, by hydraulic fracturing. In hydraulic fracturing, a fracturing fluid (for example, proppants and one or more chemicals in an aqueous or non-aqueous base fluid) is flowed through the hydrocarbon reservoir at high pressure. The pressure of the fracturing fluid fractures the reservoir rock to increase mobility of the trapped hydrocarbons. Some reservoirs include an organic material called kerogen intertwined with the rock matrix. The kerogen which is intertwined within the rock matrix can drastically increase the tensile strength of the rock. As a result, a significant amount of energy can be required to propagate fractures in these reservoirs.

SUMMARY

This disclosure relates to increasing hydraulic fracturing efficiencies in subterranean formations, for example, unconventional rock reservoirs.

Provided in this disclosure, in part, are methods, compositions, and systems for degrading organic matter, such as kerogen, in a subterranean formation. Further, these methods, compositions, and systems allow for increased hydraulic fracturing efficiencies in subterranean formations, such as unconventional rock reservoirs.

Certain aspects of the subject matter described in this disclosure can be implemented as a method. A composition configured to degrade organic matter in a subterranean formation—such as kerogen that is intertwined in a subterranean formation—can be placed into the subterranean formation as part of a hydraulic fracturing treatment.

This, and other aspects, can include one or more of the following features. The organic matter can be kerogen and the composition can be configured to degrade the kerogen. To degrade the kerogen, the composition can reduce the tensile properties of the kerogen rendering the kerogen partially, substantially, or entirely incapable of affecting the tensile strength of the reservoir rock. The composition can include an oxidizer. The oxidizer can include hydrogen peroxide or inorganic peroxides. The composition can include a persulfate. The persulfates can include potassium persulfate, ammonium persulfate, or a combination thereof. The composition can include a bromate. The bromates can include sodium bromate. The composition can include a permanganate. The permanganate can include potassium permanganate. The composition can include an ion or a compound capable of forming an ion. The ion or compound capable of forming an ion can be a cation or a compound capable of forming a cation. The cation or compound capable of forming the cation can be an imidazolium, an imidazole, an ammonium, an ammonia, a pyrrolidinium, a pyrrolidine, pyridinium, a pyridine, a phosphonium or a combination thereof. The cation or compound capable of forming a cation can also include long or short aliphatic groups. The aliphatic groups can include ethyl, butyl or hexyl. For example, the cation or compound capable of forming a cation can include 1-ethyl-3-methylimidazolium, 1-Butyl-1-methylpyrrolidinium, tetrabutylphosphonium, or a combination thereof. The ion or compound capable of forming an ion can be an anion or a compound capable of forming an anion. The anion or compound capable of forming the anion can include chloride, bromide, iodide, tetrafluoroborate, hexafluorophosphate, sulfonate, or a combination thereof. A friction reducer can be added to the composition. A catalyst can also be added to the composition. The catalyst can be a metal catalyst. The fluid can be a hydraulic fracture fluid, a pad fluid that is flowed into the subterranean formation before a hydraulic fracture fluid, or a combination of them. The composition's release into the subterranean formation can be delayed. To delay the release of the composition into the subterranean formation, the composition can be encapsulated. Byproducts of a chemical reaction between the composition and the kerogen can be removed from the subterranean formation. The subterranean formation can be analyzed for kerogen. The quantity of the composition added to the subterranean formation can be determined in response to analyzing the subterranean formation for kerogen.

In some embodiments the composition can be encapsulated and configured to be flowed into a subterranean formation. The encapsulated composition can be configured to be slow-released into the subterranean formation. The composition can be configured to degrade organic matter intertwined with the subterranean formation. Slow-releasing the composition into the reservoir rock can controllably delay contact between the reservoir rock and the composition to degrade the organic matter.

This, and other aspects, can include one or more of the following features. The composition can be a hydraulic fracture fluid, a pad fluid that is flowed into the reservoir before a hydraulic fracture fluid or a combination thereof. The composition can be encapsulated using a coating. The coating can be configured to degrade over time to allow the composition to flow through the coating. The coating can be configured to break during fracture closure releasing the composition.

Also provided in this disclosure is a method of treating kerogen in a subterranean formation that includes placing in the subterranean formation a composition including a first oxidizer including a persulfate and a second oxidizer including a bromate.

The persulfate can include an ammonium persulfate, a potassium persulfate, a sodium persulfate, or a combination thereof. In some embodiments, the persulfate includes an ammonium persulfate.

The persulfate can have a concentration of about 0.00005 M to about 1.00 M. For example, the persulfate can have a concentration of about 0.05 M to about 0.20 M. The persulfate can also have a concentration of about 0.05 M to about 0.10 M.

The bromate can include a potassium bromate, a sodium bromate, or a combination thereof. In some embodiments, the bromate includes a sodium bromate.

The bromate can have a concentration of about 0.00005 M to about 2.00 M. For example, the bromate can have a concentration of about 0.05 M to about 0.50 M. The bromate can also have a concentration of about 0.05 M to about 0.20 M.

In some embodiments, the persulfate includes ammonium persulfate and the bromate includes sodium bromate. The ammonium persulfate can have a concentration of about 0.00005 M to about 1.00 M and the sodium bromate can have a concentration of about 0.00005 M to about 2.00 M. In some embodiments, the ammonium persulfate has a concentration of about 0.05 M to about 0.10 M and the sodium bromate has a concentration of about 0.05 M to about 0.20 M.

The composition can further include a salt. The salt can include potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. In some embodiments, the salt includes potassium chloride.

The salt can be present at a concentration of about 0.001 wt % to about 20 wt %. For example, the salt can be present at a concentration of about 1 wt % to about 10 wt %. In some embodiments, the salt is present at a concentration of about 2 wt % to about 7 wt %.

In some embodiments, the composition further includes an ion or a compound capable of forming an ion. The ion or the compound capable of forming an ion can include a cation, a compound capable of forming a cation, an anion, a compound capable of forming an anion, or combination thereof. The cation or compound capable of forming a cation can include an imidazolium, an imidazole, an ammonium, an ammonia, a pyrrolidinium, a pyrrolidine, pyridinium, a pyridine, a phosphonium or a combination thereof. The anion or compound capable of forming an anion can include chloride, bromide, iodide, tetrafluoroborate, hexafluorophosphate, sulfonate, or a combination thereof.

The composition can further include an aqueous liquid. The aqueous liquid can include a water, a brine, a produced water, a flowback water, a brackish water, an Arab-D-brine, a sea water, or a combination thereof. The aqueous liquid can include a drilling fluid, a fracturing fluid, a diverting fluid, a lost circulation treatment fluid, or a combination thereof.

In some embodiments, the method further includes obtaining or providing the composition, wherein the obtaining or providing of the composition occurs above-surface. In some embodiments, the method further includes obtaining or providing the composition, wherein the obtaining or providing of the composition occurs in the subterranean formation.

The method can further include combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation includes placing the mixture in the subterranean formation.

In some embodiments, at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

In some embodiments, the composition further includes saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, diluent, plasticizer, filler or inorganic particle, pigment, dye, precipitating agent, rheology modifier, oil-wetting agent, set retarding additive, surfactant, corrosion inhibitor, gas, weight reducing additive, heavyweight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

In some embodiments, the composition further includes a proppant, a resin-coated proppant, or a combination thereof.

The method can further include processing the composition exiting the annulus with at least one fluid processing unit to generate a cleaned composition and recirculating the cleaned composition through the wellbore.

In some embodiments, the method further includes fracturing the subterranean formation. The subterranean formation can be penetrated by a wellbore. The fracturing can include slickwater fracturing.

Also provided in this disclosure is a method of treating kerogen in a subterranean formation that includes placing in a subterranean formation a composition that includes a first oxidizer including an ammonium persulfate and a second oxidizer including a sodium bromate. The ammonium persulfate has a concentration of about 0.00005 M to about 0.10 M and the sodium bromate has a concentration of about 0.00005 M to about 0.20 M.

Further provided in this disclosure is a method of fracturing a subterranean formation penetrated by a wellbore that includes treating kerogen in the subterranean formation with a composition and fracturing the subterranean formation. The composition includes a first oxidizer that includes a persulfate and a second oxidizer that includes a bromate. The persulfate has a concentration of about 0.00005 M to about 1.0 M and the bromate has a concentration of about 0.00005 M to about 0.20 M.

Also provided in this disclosure is a method of treating kerogen in a subterranean formation that includes placing in the subterranean formation a composition that includes a first oxidizer including an ammonium persulfate, a second oxidizer including a sodium bromate, and a salt. The ammonium persulfate has a concentration of about 0.00005 M to about 0.10 M, the sodium bromate has a concentration of about 0.00005 M to about 0.20 M, and the salt has a concentration of about 0.001 wt % to about 10 wt %.

Further provided in this disclosure is a method of fracturing a subterranean formation penetrated by a wellbore that includes treating kerogen in the subterranean formation with a composition and fracturing the subterranean formation. The composition includes a first oxidizer that includes an ammonium persulfate, a second oxidizer that includes a sodium bromate and a salt. The ammonium persulfate has a concentration of about 0.00005 M to about 0.10 M, the sodium bromate has a concentration of about 0.00005 M to about 0.20 M, and the salt has a concentration of about 0.001 wt % to about 10 wt %.

Also provided in this disclosure is a method of treating kerogen in a subterranean formation that includes placing in the subterranean formation a composition including an oxidizer.

In some embodiments, the oxidizer includes hydrogen peroxide, an inorganic peroxide, a bromate, a persulfate, a permanganate, a chlorate, an iodate, a perchlorate, a periodate, a perborate, or a combination thereof. For example, the oxidizer can include ammonium persulfate, sodium bromate, or a combination thereof. The oxidizer can have a concentration of about 0.00005 M to about 4.00 M.

In some embodiments, the composition further includes an aqueous liquid. The aqueous liquid can include a brine, a produced water, a flowback water, a brackish water, an Arab-D-brine, a sea water, or combinations thereof.

In some embodiments, the composition further includes a salt. The salt can be an ammonium salt. The ammonium can include ammonium chloride, ammonium bromide, ammonium iodide, or a combination thereof.

In some embodiments, the method further includes fracturing the subterranean formation.

Various embodiments of the methods and compositions provided in this disclosure provide certain advantages over other methods and compositions, at least some of which are unexpected. For example, the methods and compositions provided in this disclosure provide

DESCRIPTION OF DRAWINGS

FIG. 2A shows an image of a reservoir rock at a macro-level. FIG. 2B shows an image of a reservoir rock matrix at a micro-level. FIG. 2C shows an image of a reservoir rock at a sub-micro level. FIG. 2D shows an example schematic of reservoir rock at a nano-level. FIG. 2E shows a schematic of kerogen.

DETAILED DESCRIPTION

Figure 1:
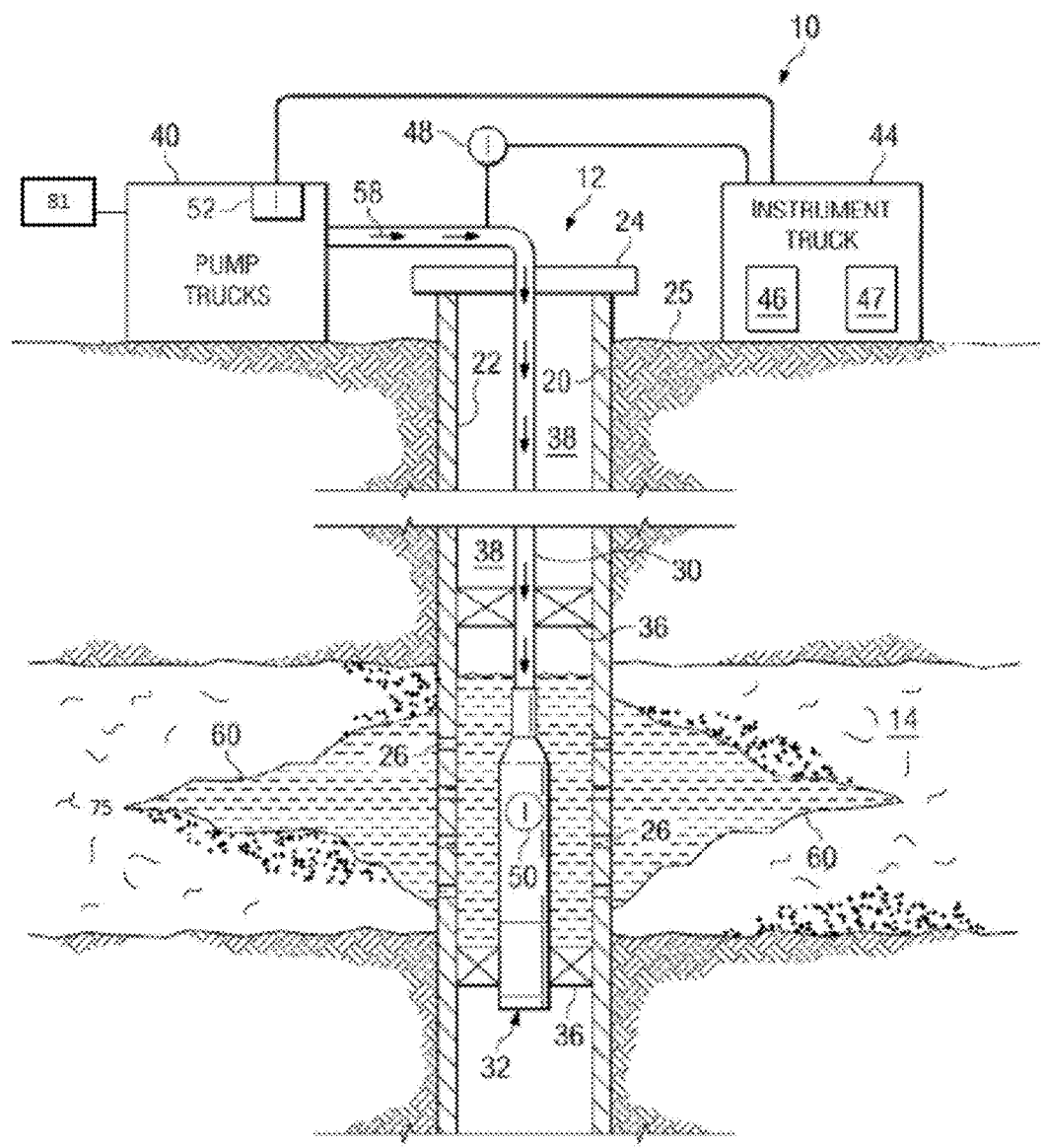
FIG. 1 shows an example of a fracture treatment for a well, as provided in this disclosure.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are methods, compositions, and systems for degrading organic matter, such as kerogen, in a subterranean formation. Further, these methods, compositions, and systems allow for increased hydraulic fracturing efficiencies in subterranean formations, such as unconventional rock reservoirs.

The compositions described within this disclosure can be used as a kerogen control material to break down, dissolve, or remove all or parts of the kerogen in or near the areas to be hydraulically fractured in a subterranean formation. Using a composition described within this disclosure, the kerogen or other organic matter (or both) can be broken down by, for example, pumping the composition into a subterranean formation.

The composition can include oxidizers including peroxides such as hydrogen peroxide or other inorganic peroxides, persulfates such as potassium persulfate or ammonium persulfate, bromates such as sodium bromate, permanganates such as potassium permanganate, or a combination thereof.

The composition can further include an ion or a compound capable of forming an ion. The ion or compound capable of forming an ion can be a cation or a compound capable of forming a cation. The cation or the compound capable of forming a cation can be an imidazolium, an imidazole, an ammonium, an ammonia, a pyrrolidinium, a pyrrolidine, pyridinium, a pyridine, a phosphonium or a combination thereof. The cation or compound capable of forming a cation can also include long or short aliphatic groups. The aliphatic groups can include ethyl, butyl or hexyl. The ion or compound capable of forming an ion can be an anion or a compound capable of forming an anion. The anion or the compound capable of forming an anion can include chloride, bromide, iodide, tetrafluoroborate, hexafluorophosphate, sulfonate, or a combination thereof.

The concentration of the components of the composition (for example, the oxidizers, ions, or compounds capable of forming ions, or a combination thereof) can depend on the quantity of kerogen or other organic matter in the reservoir rock. For example, the concentration of the oxidizer in the composition can be high for formations in which the quantity of organic matter to be removed or partially removed is high.

In some embodiments, the composition includes a friction reducer.

In some embodiments, persulfates can be used for lower temperature formations. In some embodiments, bromates can be used for higher temperature formations.

In some embodiments, catalysts, for example, metal catalysts, can be added to the fluid to increase a rate of chemical reaction.

The composition can further include a fracturing fluid or a pad fluid and can be pumped into a subterranean formation before fracturing, during fracturing, or both. In some embodiments, the release of the composition including oxidizers can be delayed from a carrier fluid. Delaying the release of the composition from a carrier fluid can be accomplished by encapsulating the composition. In some embodiments, the composition can be encapsulated with coatings through which the composition can be slow-released. Alternatively, or in addition, the coatings can break during fracture closure to release the composition. The composition can be a solid or a powder that can be encapsulated. A delayed release of the composition can decrease corrosion issues (for example, in metal tubing in the wellbore through which the fluids are delivered to the formation) and polymer degradation in the treating fluid. The polymers subject to degradation include, for example, friction reducers or other polymers used in hydraulic fracturing.

FIG. 1 illustrates an example of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, the formation 14 includes an underground formation of naturally fractured rock containing hydrocarbons (for example, oil, gas, or both). For example, the formation 14 can include a fractured shale. In some implementations, the well 12 can intersect other suitable types of formations 14, including reservoirs that are not naturally fractured in any significant amount.

The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the fracture treatment 10, a work string 30 can be disposed in the well bore 20. The work string 30 can be coiled tubing, sectioned pipe or other suitable tubing. A fracturing tool 32 can be coupled to an end of the work string 30. Packers 36 can seal an annulus 38 of the well bore 20 above and below the formation 14. Packers 36 can be mechanical, fluid inflatable or other suitable packers.

One or more pump trucks 40 can be coupled to the work string 30 at the surface 25. The pump trucks 40 pump fracture fluid 58 down the work string 30 to perform the fracture treatment 10 and generate the fracture 60. The fracture fluid 58 can include a fluid pad, proppants and/or a flush fluid. The pump trucks 40 can include mobile vehicles, equipment such as skids or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase and/or flush phase of the fracture treatment 10. The fracture control system 46 communicates with surface and/or subsurface instruments to monitor and control the fracture treatment 10. In some implementations, the surface and subsurface instruments may include surface sensors 48, down-hole sensors 50 and pump controls 52.

A quantity of energy applied by the fracture control system 46 to generate the fractures 60 in the reservoir or formation 14 can be affected not only by the properties of the reservoir rock in the formation but also by the organic matter (for example, kerogen 75) intertwined within the rock matrix. As discussed within this disclosure, kerogen in a reservoir can increase the tensile strength of the rock, for example, by as much as 100-fold, resulting in a corresponding increase in the ultimate tensile strength of the rock. The high modulus of toughness of the rock-kerogen combination compared to the rock alone can require a large quantity of energy to generate fractures in such a reservoir. Moreover, the presence of kerogen in the reservoir can affect production as well. For example, the rubber-like properties of elastomeric kerogen has a high elasticity, which can prematurely close fractures resulting in decrease in production. Accordingly, the presence of kerogen in a subterranean formation can decrease an efficiency of hydraulic fracturing treatments.

This specification describes compositions 81 to degrade the kerogen encountered in subterranean formations, such as at the openings of cracks in hydraulic fractures. The compositions can include hydraulic fracturing fluids (for example, the fracture fluid 58) and flowed through the subterranean formation (for example a reservoir). As or after the kerogen is degraded, a quantity of energy to generate and propagate fractures in the subterranean formation (for example a reservoir) can decrease, thereby increasing an efficiency (for example, cost, time, long-term effect, etc.) of the fracturing process. In addition, fracture length and formation surface exposure after wellbore shut-in can be greater than corresponding parameters in reservoirs in which the kerogen has not been degraded. In addition, removing or partially removing the kerogen and other organic matter from the near fracture zone can decrease the propensity for the fractures to close (reheal) after the pressure is released from pumping the fracturing, thereby improving the overall productivity of the well.

FIGS. 2A-2E show images and schematics of a multi-scale model of kerogen-rich rock (for example, shale). For example, FIG. 2A, FIG. 2B, and FIG. 2C show an image of a reservoir rock matrix at a macro-level, a micro-level, and a sub-micro level, respectively. FIGS. 2D and 2E show examples of schematics of reservoir rock and kerogen, respectively, at a nano-level. The image in FIG. 2A is taken at a scale greater than $10^{-3}$ m. The image shows layered composite shale with clay/quartz matrix in light gray and organic layers in relatively darker gray. The image in FIG. 2B is taken at a scale greater than $10^{-5}$ m. The image shows kerogen and micro-pores distributed through the mineral matrix. The micro-bedding planes and micro-fractures shown in FIG. 2B demonstrate that failure mechanisms of such composites can be very complex. For example, in tensile loadings, the polymer- and rubberlike-kerogen embedded in the shale matrix, at all scales, can augment the tensile rupture, which is related to modulus of toughness, of the granular fractured structure matrix. The image in FIG. 2C is taken at a scale greater than $10^{-7}$ m. The image shows nano-porous minerals interwoven with nano-porous organic matter. FIGS. 2D and 2E are schematics taken at a scale greater than $10^{-9}$ m. FIG. 2D is a schematic of elementary components such as clays, for example, illite, smectite. FIG. 2E is a schematic of organic molecules, for example, kerogen molecules.

The compositions described in this disclosure can be used as a kerogen control material to break down, dissolve, or remove all or parts of the kerogen in or near the areas to be hydraulically fractured. Using the compositions described in this disclosure, the kerogen or other organic matter (or both) can be broken down. To do so, aqueous fluids which contain oxidizers can be pumped into the subterranean formation. For example, the compositions can include strong oxidizers including peroxides such as hydrogen peroxide or other inorganic peroxides, persulfates such as potassium persulfate or ammonium persulfate, bromates such as sodium bromate, permanganates such as potassium permanganate producing weak organic acids and carbon dioxide.

The byproducts of the reaction between the kerogen and the composition can dissipate as gases or can dissolve in an aqueous media of a fluid, such as a fracture fluid. The byproducts can then be removed from the formation during flowback of the fracturing fluid.

Figure 3:
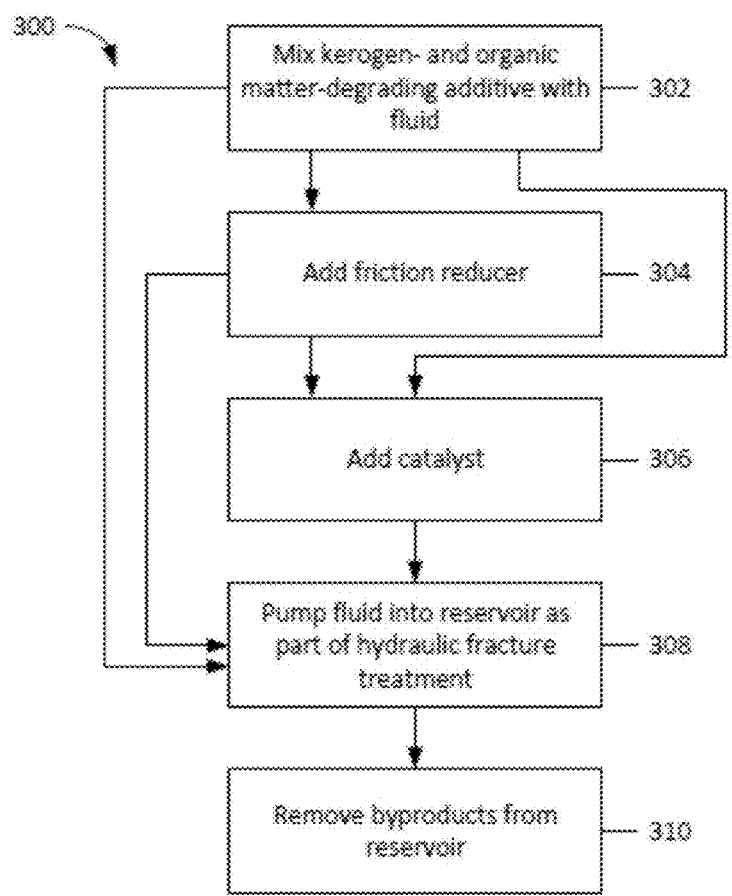
FIG. 3 is a flowchart of an example of a process for degrading kerogen in a subterranean formation, as provided in this disclosure.

FIG. 3 is a flowchart of an example of a process 300 for degrading kerogen in reservoir rock. At 302, a kerogen- and organic matter-degrading composition (for example composition including an oxidizer) is mixed with a fluid. The fluid can be a hydraulic fracture fluid or a pad fluid that is flowed into the reservoir before the hydraulic fracture fluid (or both). At 308, the composition and the fluid is flowed into the reservoir as part of a hydraulic fracture treatment. As described above, the kerogen and organic matter degrade upon reacting with the composition. At 310, byproducts of the reaction are removed from the reservoir. For example, the byproducts escape as gases or are pumped out of the reservoir. At 304, friction reducer can be added to the mixture of the composition and the fluid before pumping the fluid into the reservoir at 308. Alternatively or in addition, at 306, catalyst can be added to composition and the fluid before pumping the fluid into the reservoir at 308.

Method of Treating a Subterranean Formation with a Composition Including an Oxidizer Further provided in this disclosure is a method of treating kerogen in a subterranean formation. The method includes placing in the subterranean formation a composition including an oxidizer.

The oxidizer can include hydrogen peroxide, an inorganic peroxide, a bromate, a persulfate, a permanganate, a chlorate, an iodate, a perchlorate, a periodate, a perborate or a combination thereof. For example, the oxidizer can include ammonium persulfate, sodium bromate, or a combination thereof. In some embodiments, the oxidizer is ammonium persulfate. In some embodiments, the oxidizer is sodium bromate.

The oxidizer can have a concentration of about 0.00005 molar (M) to about 4.00 M. For example, the bromate can have a concentration of about 0.00005, 0.0005, 0.005, 0.05 M, 0.10 M, 0.20 M, 0.30 M, 0.40 M, 0.50 M, 0.75 M, 1.0 M, 1.25 M, 1.50 M, 2.0 M, 3.0 M, or about 4.0 M.

The necessary concentration of the oxidizer in the composition can be determined based on the oxidizer selected, the on the amount of fluid downhole at the time of placing the composition into the subterranean formation, as well as the amount and type of kerogen in the subterranean formation. Other factors that are relevant for determining the concentration of oxidizer required include the amount of pyrite or other iron sulfides in the subterranean formation as well as the amount of friction reducer, viscosifier or other organic component in the treatment fluid. Further, estimating the rock surface area within the fracture network with which the treatment fluid will make contact in the formation can be considered.

For example, the concentration of the oxidizer can be determined by performing at least one of the following: (i) performing laboratory tests on kerogen embedded in rock surfaces (for example, etching); (ii) estimating the expected size of the fracture network and the resulting surface area of the fractured zones; (iii) determine the weight percent of the total organic carbon (TOC) in the formation (for example, by using a TOC analyzer, pyrolysis unit, well log, or a combination thereof); (iv) determining the weight percent of iron sulfide in the formation (for example by testing using either x-ray fluorescence, x-ray diffraction, energy dispersive x-ray spectroscopy, well log, or a combination thereof); (v) determining the weight percent of friction reducer, viscosifier, and other organic materials in the treatment fluid; and (vi) determining the oxidizer concentration by accounting for the amount needed to degrade the kerogen while also accounting for the iron sulfide present and any organic materials present in the treatment fluid.

The composition can further include an ion or compound capable of forming an ion. The ion or compound capable of forming an ion can be a cation, a compound capable of forming a cation, an anion, a compound capable of forming an anion, or a combination thereof. The ion or compound capable of forming an ion can include a cation, a compound capable of forming a cation, or a combination thereof. The cation or a compound capable of forming a cation can be an imidazolium, an imidazole, an ammonium, an ammonia, a pyrrolidinium, a pyrrolidine, pyridinium, a pyridine, a phosphonium or a combination thereof. The cation or compound capable of forming a cation can also include long or short aliphatic groups. The aliphatic groups can include ethyl, butyl or hexyl. For example, the cation or compound capable of forming a cation can include 1-ethyl-3-methylimidazolium, 1-Butyl-1-methylpyrrolidinium, tetrabutylphosphonium, or a combination thereof. The ion or compound capable of forming an ion can include an anion, a compound capable of forming an anion, or a combination thereof. The anion can include chloride, bromide, iodide, tetrafluoroborate, hexafluorophosphate, sulfonate, or a combination thereof.

In some embodiments, the composition further includes an aqueous liquid. The aqueous liquid can include a brine, a produced water, a flowback water, a brackish water, an Arab-D-brine, a sea water, or a combination thereof. The aqueous liquid can include a drilling fluid, a fracturing fluid, a diverting fluid, a lost circulation treatment fluid, or a combination thereof.

The composition can further include a salt. In some embodiments, the salt includes potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. For example, the salt can be an ammonium salt such as ammonium chloride, ammonium bromide, ammonium iodide, or a combination thereof. In some embodiments, the salt is ammonium chloride. The salt can be present at a concentration of about 0.001 wt % to about 30 wt % of the composition, about 0.001 wt % to about 25 wt %, about 0.001 wt % to about 20 wt %, about 0.001 wt % to about 15 wt %, or about 0.001 wt % to about 10 wt % of the composition. For example, the salt can be present at a concentration of about 2 wt % to about 7 wt %.

The method can further include fracturing the subterranean formation. In some embodiments, the fracturing includes slickwater fracturing.

In some embodiments the composition can be encapsulated and configured to be flowed into a subterranean formation. The encapsulated composition can be configured to be slow-released into the subterranean formation. Slow-releasing the composition into the reservoir rock can controllably delay contact between the reservoir rock and the composition to degrade the organic matter. The encapsulated composition can also be configured to break during fracture closure releasing the composition.

Method of Treating a Subterranean Formation with a Composition Including Two Oxidizers Also provided in this disclosure is a method of treating kerogen in a subterranean formation. The method includes placing in the subterranean formation a composition. The composition includes a first oxidizer that includes a persulfate and a second oxidizer that includes a bromate.

A synergism between persulfate oxidizers (such as ammonium persulfate) and bromate oxidizers (such as sodium bromate) for the treatment and breakdown of kerogen has been discovered.

The persulfate can include an ammonium persulfate, a potassium persulfate, a sodium persulfate, or a combination thereof. In some embodiments, the persulfate includes an ammonium persulfate.

The persulfate can have a concentration of about 0.00005 M to about 1.00 M. For example, the persulfate can have a concentration of about 0.00005 M, 0.0005 M, 0.005, M 0.05 M, 0.10 M, 0.20 M, 0.30 M, 0.40 M, 0.50 M, 0.75 M, or about 1.00 M. The persulfate can have a concentration of about 0.05 M to about 0.20 M. In some embodiments, the persulfate has a concentration of about 0.05 M to about 0.10 M. For example, the persulfate can have a concentration of about 0.05 M, 0.06 M, 0.07 M, 0.08 M, 0.09 M, or about 0.10 M.

The concentration of the persulfate can be calculated based on the amount of the persulfate in the composition to be placed in the subterranean formation. For example, 0.2 grams (g) of ammonium persulfate (($NH_4)_2S_2O_8$; molecular weight: 228.20) in 10 mL of the composition, which is provided as a fluid, would have a molarity of 0.0876 M. Alternatively, the concentration of the persulfate can be estimated based on the amount of the persulfate in the composition and the amount of fluid downhole at the time of placing the composition into the subterranean formation.

The necessary concentration of the persulfate in the composition can also be determined based on the on the amount of fluid downhole at the time of placing the composition into the subterranean formation as well as the amount and type of kerogen in the subterranean formation.

The bromate can include calcium bromate, magnesium bromate, potassium bromate, sodium bromate, or a combination thereof. In some embodiments, the bromate includes sodium bromate.

The bromate can have a concentration of about 0.00005 M to about 2.00 M. For example, the bromate can have a concentration of about 0.00005 M, 0.0005 M, 0.005 M, 0.05 M, 0.10 M, 0.20 M, 0.30 M, 0.40 M, 0.50 M, 0.75 M, 1.0 M, 1.25 M, 1.50 M or about 2.0 M. The bromate can also have a concentration of about 0.05 M to about 0.50 M. For example, the bromate can have a concentration of about 0.05 M, 0.10 M, 0.15 M, 0.20 M, 0.30 M, 0.40 M, or about 0.50 M. In some embodiments, the bromate can have a concentration of about 0.05 M to about 0.20 M. For example, the bromate can have a concentration of about 0.10 M to about 0.15 M.

The concentration of the bromate can be calculated based on the amount of the bromate in the composition to be placed in the subterranean formation. For example, 0.2 g of sodium bromate ($NaBrO_3$; molecular weight: 150.89) in 10 mL of the composition, which is provided as a fluid, would have a molarity of 0.133 M. Alternatively, the concentration of the bromate in the composition can be estimated based on the amount of the bromate in the composition and the amount of fluid downhole at the time of placing the composition into the subterranean formation.

The necessary concentration of the bromate in the composition can also be determined based on the on the amount of fluid downhole at the time of placing the composition into the subterranean formation as well as the amount and type of kerogen in the subterranean formation.

In some embodiments, the persulfate includes ammonium persulfate and the bromate includes sodium bromate. The ammonium persulfate can have a concentration of about 0.00005 M to about 1.00 M and the sodium bromate can have a concentration of about 0.00005 M to about 2.00 M. For example, the ammonium persulfate can have a concentration of about 0.00005 M to about 1.00 M, about 0.0005 M to about 0.75 M, about 0.005 M to about 0.50 M, about 0.05 M to about 0.40 M, about 0.05 M to about 0.30 M, about 0.05 M to about 0.20 M, or about 0.05 M to about 0.10 M and the sodium bromate can have a concentration of about 0.00005 M to about 1.50 M, about 0.0005 M to about 1.25 M, about 0.005 M to about 1.00 M, about 0.05 M to about 0.75 M, about 0.05 M to about 0.50 M, about 0.05 M to about 0.40 M, about 0.05 M to about 0.30 M, about 0.05 M to about 0.20 M. In some embodiments, the ammonium persulfate has a concentration of about 0.05 M to about 0.10 M and the sodium bromate has a concentration of about 0.05 M to about 0.20 M.

The concentration of the first oxidizer and second oxidizer can also be determined by performing at least one of the following: (i) performing laboratory tests on kerogen embedded in rock surfaces (for example, etching); (ii) estimating the expected size of the fracture network and the resulting surface area of the fractured zones; (iii) determine the weight percent of the total organic carbon (TOC) in the formation (for example, by using a TOC analyzer, pyrolysis unit, well log, or a combination thereof); (iv) determining the weight percent of iron sulfide in the formation (for example by testing using either x-ray fluorescence, x-ray diffraction, energy dispersive x-ray spectroscopy, well log, or a combination thereof); (v) determining the weight percent of friction reducer, viscosifier, and other organic materials in the treatment fluid; and (vi) determining the concentration of the first oxidizer and second oxidizer by accounting for the amount needed to degrade the kerogen while also accounting for the iron sulfide present and any organic materials present in the treatment fluid.

The composition can further include a salt. Including a salt in the composition can preserve the strength of rock in a subterranean formation when the rock is contacted with a composition, such as a composition describe in this disclosure. For example, it has been observed that the addition of a salt to a composition of the present disclosure can decrease the reduction of a rock's Young's modulus when the rock is contacted with a composition, such as a composition describe in this disclosure.

In some embodiments, the salt includes potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. For example, the salt can include potassium chloride. The salt can be present at a concentration of about 0.001 wt % to about 30 wt % of the composition, about 0.001 wt % to about 25 wt %, about 0.001 wt % to about 20 wt %, about 0.001 wt % to about 15 wt %, or about 0.001 wt % to about 10 wt % of the composition. For example, the salt can be present at a concentration of about 2 wt % to about 7 wt %.

The composition can further include an ion or compound capable of forming an ion. The ion or compound capable of forming an ion can be a cation, a compound capable of forming a cation, an anion, a compound capable of forming an anion, or a combination thereof. The ion or compound capable of forming an ion can include a cation, a compound capable of forming a cation, or a combination thereof. The cation or a compound capable of forming a cation can be an imidazolium, an imidazole, an ammonium, an ammonia, a pyrrolidinium, a pyrrolidine, pyridinium, a pyridine, a phosphonium or a combination thereof. The ion or compound capable of forming an ion can include an anion, a compound capable of forming an anion, or a combination thereof. The anion can include chloride, bromide, iodide, tetrafluoroborate, hexafluorophosphate, sulfonate, or a combination thereof.

In some embodiments, the composition further includes an aqueous liquid. The aqueous liquid can include a brine, a produced water, a flowback water, a brackish water, an Arab-D-brine, a sea water, or a combination thereof. The aqueous liquid can include a drilling fluid, a fracturing fluid, a diverting fluid, a lost circulation treatment fluid, or a combination thereof.

The method can also include obtaining or providing the composition, wherein the obtaining or providing of the composition occurs above-surface. In some embodiments, the method includes obtaining or providing the composition, wherein the obtaining or providing of the composition occurs in the subterranean formation. For example, the first oxidizer including a persulfate can initially be placed in the subterranean formation and, at a later time, the second oxidizer including a bromate can be placed in the subterranean formation. Alternatively, the second oxidizer including a bromate can initially be placed in the subterranean formation and, at a later time, the first oxidizer including a persulfate can be placed in the subterranean formation.

The method can also further include combining the composition with an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation includes placing the mixture in the subterranean formation.

In some embodiments, at least one of prior to, during, and after the placing of the composition in the subterranean formation, the composition is used in the subterranean formation, at least one of alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

The composition can also further include a saline, an aqueous base, an oil, an organic solvent, a synthetic fluid oil phase, an aqueous solution, an alcohol or polyol, a cellulose, a starch, an alkalinity control agent, an acidity control agent, a density control agent, a density modifier, an emulsifier, a dispersant, a polymeric stabilizer, a crosslinking agent, a polyacrylamide, a polymer or combination of polymers, an antioxidant, a heat stabilizer, a foam control agent, a diluent, a plasticizer, a filler or inorganic particle, a pigment, a dye, a precipitating agent, a rheology modifier, an oil-wetting agent, a set retarding additive, a surfactant, a corrosion inhibitor, a gas, a weight reducing additive, a heavy-weight additive, a lost circulation material, a filtration control additive, a salt, a fiber, a thixotropic additive, a breaker, a curing accelerator, a curing retarder, a pH modifier, chelating agent, a scale inhibitor, an enzyme, a resin, a water control material, an additional oxidizer, a marker, a Portland cement, pozzolana cement, a gypsum cement, a high alumina content cement, a slag cement, a silica cement, a fly ash, a metakaolin, a shale, a zeolite, a crystalline silica compound, an amorphous silica, a hydratable clay, a microsphere, a pozzolan lime, or a combination thereof.

In some embodiments the composition can further include a proppant, a resin-coated proppant, or a combination thereof.

In some embodiments, the method further includes processing the composition exiting the annulus with at least one fluid processing unit to generate a cleaned composition and recirculating the cleaned composition into the subterranean formation.

The method can further include fracturing the subterranean formation. In some embodiments, the fracturing includes slickwater fracturing. The slickwater fracturing can employ a low viscosity aqueous fluid to induce a subterranean fracture. The slickwater fluids can include a fresh water or a brine having sufficient friction reducing agents to minimize the tubular friction pressures. Such fluids can have viscosities that are slightly higher than unmodified fresh water or brine.

Also provided in this disclosure is a method of treating kerogen in a subterranean formation, that includes placing in the subterranean formation a composition including a first oxidizer including an ammonium persulfate and a second oxidizer including a sodium bromate. The ammonium persulfate has a concentration of about 0.05 M to about 0.10 M and the sodium bromate has a concentration of about 0.05 M to about 0.20 M.

Further provided in this disclosure is a method of fracturing a subterranean formation penetrated by a wellbore. The method includes treating kerogen in the subterranean formation with a composition including a first oxidizer including a persulfate and a second oxidizer comprising a bromate. The method further includes fracturing the subterranean formation. In some embodiments the persulfate has a concentration of about 0.05 M to about 1.0 M and the bromate has a concentration of about 0.05 M to about 0.20 M.

Also provided in this disclosure is a method of treating kerogen a subterranean formation that includes placing in the subterranean formation a composition that includes a first oxidizer including an ammonium persulfate, a second oxidizer including a sodium bromate, and a salt. In some embodiments, the ammonium persulfate has a concentration of about 0.05 M to about 0.10 M, the sodium bromate has a concentration of about 0.05 M to about 0.20 M, and the salt has a concentration of about 0.001 wt % to about 10 wt %.

Further provided in this disclosure is a method of fracturing a subterranean formation penetrated by a wellbore that includes treating kerogen in the subterranean formation with a composition including a first oxidizer including an ammonium persulfate, a second oxidizer including a sodium bromate, and a salt. The method further includes fracturing the subterranean formation.

In some embodiments, the ammonium persulfate has a concentration of about 0.00005 M to about 0.10 M, the sodium bromate has a concentration of about 0.00005 M to about 0.20 M, and the salt has a concentration of about 0.001 wt % to about 10 wt %.

Compositions Including Two Oxidizers

Further provided in this disclosure is a composition. The composition includes a first oxidizer that includes a persulfate and a second oxidizer that includes a bromate.

The persulfate can include an ammonium persulfate, a potassium persulfate, a sodium persulfate, and combinations thereof. In some embodiments, the persulfate includes an ammonium persulfate.

The persulfate can have a concentration of about 0.00005 M to about 1.00 M. For example, the persulfate can have a concentration of about 0.00005 M, 0.0005 M, 0.005, M 0.05 M, 0.10 M, 0.20 M, 0.30 M, 0.40 M, 0.50 M, 0.75 M, or about 1.00 M. The persulfate can have a concentration of about 0.05 M to about 0.20 M. In some embodiments, the persulfate has a concentration of about 0.05 M to about 0.10 M. For example, the persulfate can have a concentration of about 0.05 M, 0.06 M, 0.07 M, 0.08 M, 0.09 M, or about 0.10 M.

The bromate can include calcium bromate, magnesium bromate, potassium bromate, sodium bromate, or a combination thereof. In some embodiments, the bromate includes sodium bromate.

The bromate can have a concentration of about 0.00005 M to about 2.00 M. For example, the bromate can have a concentration of about 0.00005 M, 0.0005 M, 0.005 M, 0.05 M, 0.10 M, 0.20 M, 0.30 M, 0.40 M, 0.50 M, 0.75 M, 1.0 M, 1.25 M, 1.50 M or about 2.0 M. The bromate can also have a concentration of about 0.05 M to about 0.50 M. For example, the bromate can have a concentration of about 0.05 M, 0.10 M, 0.15 M, 0.20 M, 0.30 M, 0.40 M, or about 0.50 M. In some embodiments, the bromate can have a concentration of about 0.05 M to about 0.20 M. For example, the bromate can have a concentration of about 0.10 M to about 0.15 M.

In some embodiments, the persulfate includes ammonium persulfate and the bromate includes sodium bromate. The ammonium persulfate can have a concentration of about 0.00005 M to about 1.00 M and the sodium bromate can have a concentration of about 0.00005 M to about 2.00 M. For example, the ammonium persulfate can have a concentration of about 0.00005 M to about 1.00 M, about 0.0005 M to about 0.75 M, about 0.005 M to about 0.50 M, about 0.05 M to about 0.40 M, about 0.05 M to about 0.30 M, about 0.05 M to about 0.20 M, or about 0.05 M to about 0.10 M and the sodium bromate can have a concentration of about 0.00005 M to about 1.50 M, about 0.0005 M to about 1.25 M, about 0.005 M to about 1.00 M, about 0.05 M to about 0.75 M, about 0.05 M to about 0.50 M, about 0.05 M to about 0.40 M, about 0.05 M to about 0.30 M, about 0.05 M to about 0.20 M. In some embodiments, the ammonium persulfate has a concentration of about 0.05 M to about 0.10 M and the sodium bromate has a concentration of about 0.05 M to about 0.20 M.

In some embodiments, the salt includes potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. For example, the salt can include potassium chloride. The salt can be present at a concentration of about 0.001 wt % to about 30 wt % of the composition, about 0.001 wt % to about 25 wt %, about 0.001 wt % to about 20 wt %, about 0.001 wt % to about 15 wt %, or about 0.001 wt % to about 10 wt % of the composition. For example, the salt can be present at a concentration of about 2 wt % to about 7 wt %.

The composition can further include an ion or compound capable of forming an ion. The ion or compound capable of forming an ion can be a cation or a compound capable of forming a cation. The cation or a compound capable of forming a cation can be an imidazolium, an imidazole, an ammonium, an ammonia, a pyrrolidinium, a pyrrolidine, pyridinium, a pyridine, a phosphonium or a combination thereof. The ion or compound capable of forming an ion can include an anion or a compound capable of forming an anion. The anion can include chloride, bromide, iodide, tetrafluoroborate, hexafluorophosphate, sulfonate, or a combination thereof.

In some embodiments, the composition further includes an aqueous liquid. The aqueous liquid can include a brine, a produced water, a flowback water, a brackish water, an Arab-D-brine, a sea water, or a combination thereof. The aqueous liquid can be include a drilling fluid, a fracturing fluid, a diverting fluid, a lost circulation treatment fluid, or a combination thereof.

Other Components

The compositions described in this disclosure can further include one or more suitable components. The additional components can be any components, such that the composition can be used as described in this disclosure.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.0001 wt % to about 10 wt % of the composition.

The viscosifier can include at least one of a linear polysaccharide, and poly(($C_2$-$C_{10}$)alkenylene), in which at each occurrence, the ($C_2$-$C_{10}$)alkenylene is independently substituted or unsubstituted. In some embodiments, the viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (for example, hydroxypropyl guar, carboxy methyl guar, or carboxymethyl hydroxylpropyl guar), gum ghatti, gum arabic, locust bean gum, and derivatized cellulose (for example, carboxymethyl cellulose, hydroxyethyl cellulose, carboxymethyl hydroxyethyl cellulose, hydroxypropyl cellulose, or methyl hydroxyl ethyl cellulose).

The viscosifier can include a poly(vinyl alcohol) homopolymer, poly(vinyl alcohol) copolymer, a crosslinked poly (vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$ alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The composition can further include a crosslinker. The crosslinker can be any suitable crosslinker. The crosslinker can be present in any suitable concentration, such as more, less, or an equal concentration as compared to the concentration of the crosslinker. The crosslinker can include at least one of boric acid, borax, a borate, a $(C_1-C_{30})$hydrocarbylboronic acid, a $(C_1-C_{30})$hydrocarbyl ester of a $(C_1-C_{30})$ hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The composition can include any suitable proportion of the crosslinker, such as about 0.1 wt % to about 50 wt %, or about 0.1 wt % to about 20 wt %, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, or about 99 wt % or more of the composition.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable ampholyte polymer and the crosslinker, or a crosslinked reaction product thereof, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

A water-based drilling fluid in methods provided in this disclosure can be any suitable water-based drilling fluid. In various embodiments, the drilling fluid can include at least one of water (fresh or brine), a salt (for example, calcium chloride, sodium chloride, potassium chloride, magnesium chloride, calcium bromide, sodium bromide, potassium bromide, calcium nitrate, sodium formate, potassium formate, cesium formate), aqueous base (for example, sodium hydroxide or potassium hydroxide), alcohol or polyol, cellulose, starches, alkalinity control agents, density control agents such as a density modifier (for example, barium sulfate), surfactants (for example, betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, foaming agents, solvents, diluents, plasticizers, filler or inorganic particles (for example, silica), pigments, dyes, precipitating agents (for example, silicates or aluminum complexes), and rheology modifiers such as thickeners or viscosifiers (for example, xanthan gum). Any ingredient listed in this paragraph can be either present or not present in the mixture.

An oil-based drilling fluid or mud in methods provided in this disclosure can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, *Composition and Properties of Drilling and Completion Fluids* 66-67, 561-562 (5th ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (for example, substantially no internal aqueous phase).

A pill is a relatively small quantity (for example, less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this disclosure as a component of a drilling fluid.

A cement fluid can include an aqueous mixture of at least one of cement and cement kiln dust. The composition including the crosslinkable ampholyte polymer and the crosslinker, or a crosslinked reaction product thereof, can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the methods described in this disclosure; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the methods described in this disclosure are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the methods described in this disclosure as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

The composition or mixture can further include a proppant, a resin-coated proppant, an encapsulated resin, or a combination thereof. A proppant is a material that keeps an induced hydraulic fracture at least partially open during or after a fracturing treatment. Proppants can be transported into the subterranean formation and to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.000.1 wt % to about 99.9 wt %, about 0.1 wt % to about 80 wt %, or about 10 wt % to about 60 wt %, or about 0.000.000.01 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

All publications, patents, and patent documents referred to in this document are incorporated by reference in this disclosure in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15° C. to about 28° C.

The term "standard temperature and pressure" as used in this disclosure refers to 20° C. and 101 kPa.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used in this disclosure, the term "fracturing fluid" refers to fluids or slurries used downhole during fracturing operations.

As used in this disclosure, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in this disclosure, the term "completion fluid" refers to fluids or slurries used downhole during the completion phase of a well, including cementing compositions.

As used in this disclosure, the term "remedial treatment fluid" refers to fluids or slurries used downhole for remedial treatment of a well. Remedial treatments can include treatments designed to increase or maintain the production rate of a well, such as stimulation or clean-up treatments.

As used in this disclosure, the term "abandonment fluid" refers to fluids or slurries used downhole during or preceding the abandonment phase of a well.

As used in this disclosure, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used in this disclosure, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used in this disclosure, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used in this disclosure, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used in this disclosure, the term "fluid" refers to liquids and gels, unless otherwise indicated.

As used in this disclosure, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used in this disclosure, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (for example, a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (for example, diesel, kerosene, napthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 weight percent (wt %) to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

EXAMPLES

Example 1

Kerogen was isolated from a rock matrix by dissolving the rock using a combination of hydrochloric acid and hydrofluoric acid. The isolated kerogen possibly contained undissolved iron sulfide or other minerals.

Figure 4:
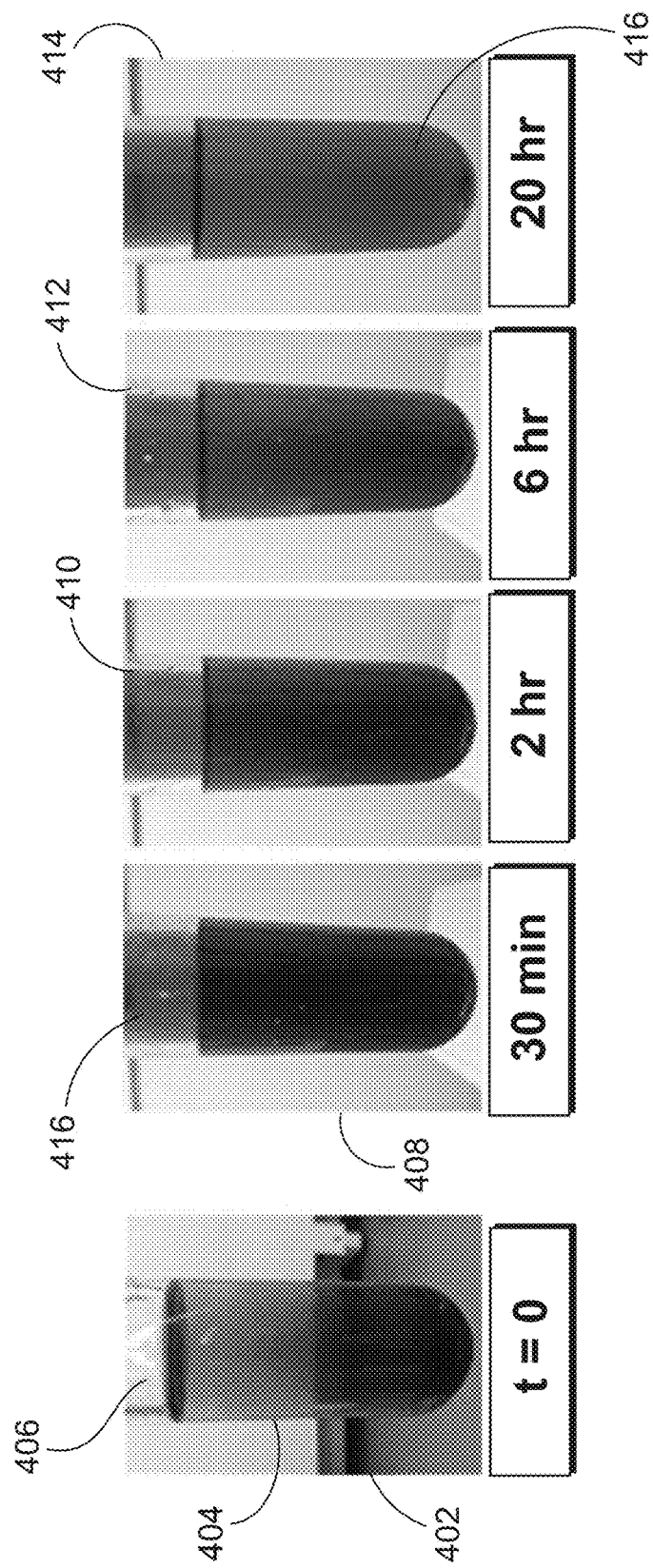
FIG. 4 shows the degradation of kerogen overtime after treatment with a mixture of sodium bromate and ammonium persulfate.

FIG. 4 shows the degradation of kerogen over time after treatment with a mixture of sodium bromate and ammonium persulfate. 1.0 g of sodium bromate and 1.0 g ammonium persulfate were dissolved in 50 mL of water. 0.10 g of isolated kerogen was added to the solution and the solution was mildly-translucent black in color, as indicated in image 402, and the pressure tube 404 was sealed 406. The time t=0 indicates that no heating has yet been applied. The mixture was heated to 100° C. in an oil bath, and within 20-30 minutes, the solution turned a blackish red color, as indicated in image 408. The mixture was heated for 24 hours, over which time the entirety of the kerogen dissolved. At 2 hours of heating, the solution was a dark red color, as indicated in image 410. At 6 hours of heating, the solution was a medium red color, as indicated in image 412. At 20 hours of heating, the solution was a relatively bright red color, as indicated in 414. FIG. 4 shows the degradation of the black kerogen over time.

It was also observed that sodium bromate at higher temperature, such as 150° C., degraded kerogen. However, an orange solid precipitate forms, which is undesirable. The orange solid precipitate may be an iron(III) oxyhydroxide species, which are largely insoluble above pH=3. Ammonium persulfate alone causes a limited amount of kerogen degradation. However, a strong synergistic effect between sodium bromate and ammonium persulfate exists. When combined, sodium bromate and ammonium persulfate degrade kerogen quickly and cleanly at 100° C. The bright red color (416 in FIG. 4) is indicative of bromine gas formation.

Example 2

Figure 5A:
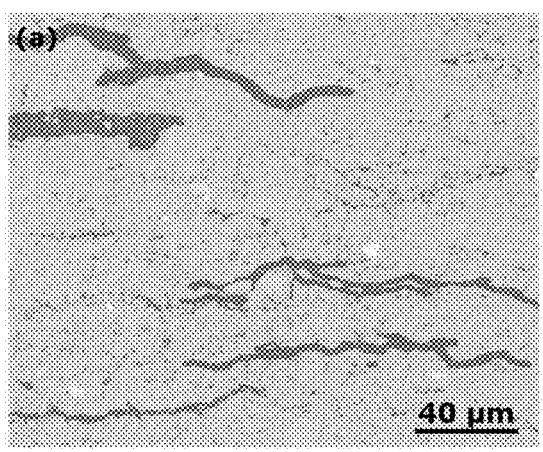
FIG. 5A-5B shows a scanning electron microscope (SEM) image of kerogen-rich shale.
Figure 5B:
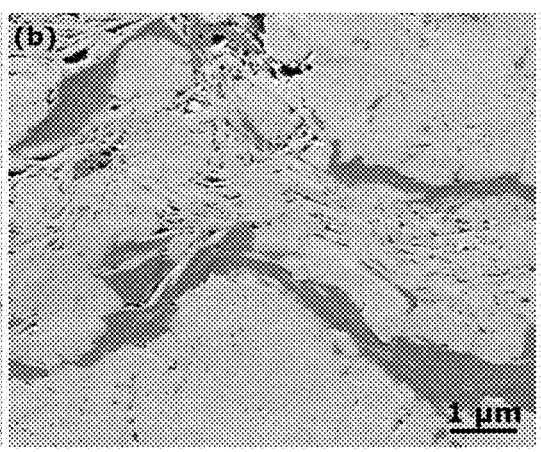

In order to establish the feasibility of degrading/etching kerogen directly from the rock matrix, a series of experiments were performed. Kerogen-rich shale samples were cut to pieces smaller than 1 cm in all dimensions, then mechanically polished on one side to enable clear visualization under a microscope. FIGS. 5A and 5B shows a scanning electron microscope (SEM) image of kerogen-rich shale. The images demonstrate the nature of interlacing that occurs between the rock matrix (light gray) and organic matter (dark gray). The organic matter can have a globular structure or more string-like configuration as shown in these images.

Figure 6:
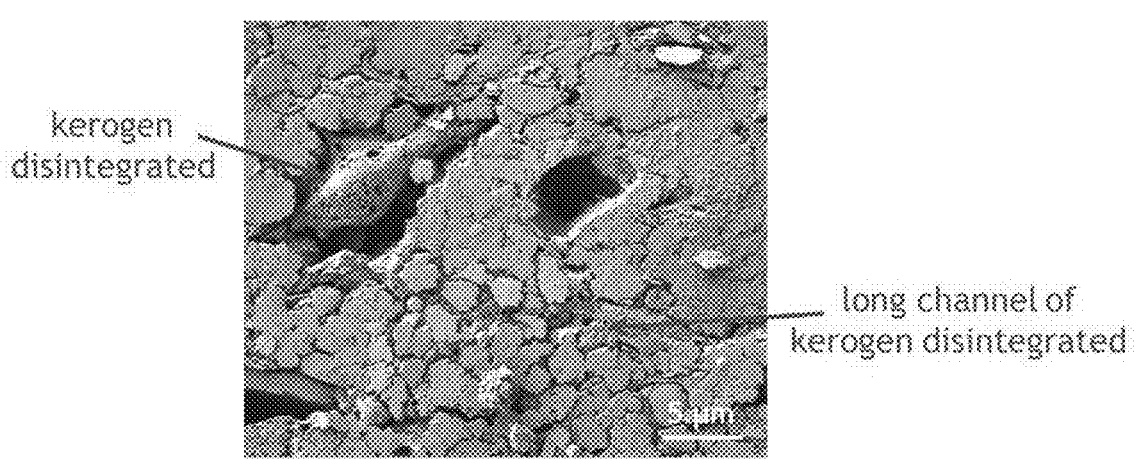
FIG. 6 shows a shale sample treated with a mixture of ammonium persulfate and sodium bromate.

A small shale sample was then unmounted and added to a treatment fluid containing 0.4 g ammonium persulfate and 0.4 g sodium bromate in 10 mL of water for 20 hours at 100° C. The fluid was then cooled, the shale sample was removed from the fluid, and was dried in an oven. After drying, SEM imaging was again performed and is shown in FIG. 6. Regions where kerogen previously filled the voids were significantly deteriorated, leaving a small amount of weakened organic matter with enlarged pores. A series of tests (14 tests) were performed to study the amount of oxidizer required to etch the kerogen from the rock. Successful etching was achieved with 0.02 g of each oxidizer in 10 mL of water.

Example 3

Figures 7A, 7B:
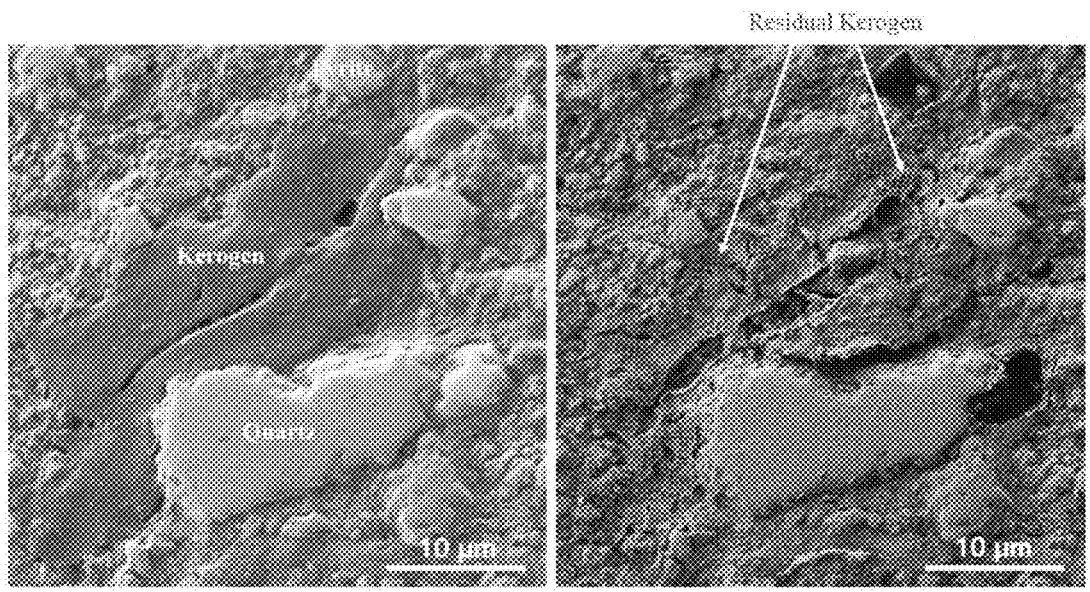
FIG. 7A shows an SEM image of a shale sample containing kerogen.
FIG. 7B shows an SEM image of the same location of the same shale sample after the sample was treated with a mixture of ammonium persulfate and sodium bromate.

A small shale sample of less than 1 centimeter (cm) in all dimensions was cut from a core sample using a diamond saw. The sample was mechanically polished first using 600 and 1200 grit silicon carbide paper then with progressively finer diamond suspensions beginning at 3 micrometer (µm) and continuing until reaching 0.05 µm. The polished samples were subsequently imaged via SEM for pretreatment analysis. A high resolution image of kerogen was obtained, noting the coordinates of the kerogen position. The sample was then transferred to a glass tube, to which was added 10 mL of water, 0.02 g (0.2%) ammonium persulfate, 0.02 g (0.2%) sodium bromate, and 0.2 (2%) g KCl. The tube was sealed and placed in an oil bath at 100° C. for 20 hours. The tube was then cooled, the shale sample was removed and dried in an oven at 50° C. The shale sample was then reimaged by SEM, locating the position of the previously imaged kerogen-containing region FIG. 7A shows an SEM image of a shale sample containing kerogen. FIG. 7B shows an SEM image of the same location of the same shale sample after the sample was treated with a mixture of ammonium persulfate and sodium bromate.

Example 4

Each of the rock samples used for the etching experiments of Example 3 were mechanically characterized to ensure that the rock itself was not being damaged during the etching of the kerogen. Each sample was tested with a nanoindenter by collecting force-displacement curves, and the mechanical properties of the material such as the Young's modulus were determined both before and after the treatments. Ten indentations up to 200 mN load were performed using a Berkovich diamond tip.

The rocks were weakened by exposure to the oxidizer as evidenced by a reduced Young's modulus. Heating specimen of the same rock in pure water alone did not change the Young's modulus. By treating the rock with oxidizers in combination with a salt such as potassium chloride (e.g., 2-7 wt %), minimal change in the rock's Young's modulus was observed even in cases where the oxidizer concentration was high. For example, for the treatment described in Example 3, the indentation curves were analyzed, and the Young's modulus was determined to be 30 GPa pre-treatment and 31 GPa post-treatment, demonstrating negligible change to the rock stiffness/integrity.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method comprising:
specifying a concentration of an oxidizer in a composition based at least in part on an amount of kerogen to be treated in a subterranean formation and on an amount of an iron sulfide in the subterranean formation; and
treating the kerogen in the subterranean formation comprising placing in the subterranean formation the composition comprising the oxidizer having the specified concentration.
2. The method of claim 1, wherein specifying the concentration further comprises specifying the concentration of the oxidizer in the composition based at least in part on an amount of fluid downhole in a wellbore in the subterranean formation, and wherein the oxidizer is selected from the group consisting of hydrogen peroxide, an inorganic peroxide, a bromate, a persulfate, a permanganate, a chlorate, an iodate, a perchlorate, a periodate, a perborate, and combinations thereof.
3. The method of claim 1, wherein specifying the concentration further comprises specifying the concentration of the oxidizer in the composition based at least in part on a type of the kerogen, and wherein the oxidizer has a concentration of about 0.00005 M to about 4.00 M.
4. The method of claim 1, wherein treating the kerogen comprises dissolving the kerogen, and wherein the composition further comprises an aqueous liquid.
5. The method of claim 1, wherein the composition further comprises a salt.
6. The method of claim 5, wherein the salt is an ammonium salt.
7. The method of claim 6, wherein the ammonium salt is selected from the group consisting of ammonium chloride, ammonium bromide, ammonium iodide, and combinations thereof.

\* \* \* \* \*